United States Patent [19]

Arroyo et al.

[11] Patent Number: 5,086,387
[45] Date of Patent: Feb. 4, 1992

[54] MULTI-FREQUENCY CLOCK GENERATION WITH LOW STATE COINCIDENCE UPON LATCHING

[75] Inventors: Ronald X. Arroyo, Elgin; James T. Hanna, Austin, both of Tex.

[73] Assignee: International Business Machines Corporation, Armonk, N.Y.

[21] Appl. No.: 203,586

[22] Filed: May 27, 1988

Related U.S. Application Data

[63] Continuation of Ser. No. 820,454, Jan. 17, 1986, abandoned.

[51] Int. Cl.⁵ .............................................. G06F 1/04
[52] U.S. Cl. .................................. 395/550; 364/270.3; 364/DIG. 1; 307/269
[58] Field of Search ... 364/200 MS File, 900 MS File, 364/707; 307/269; 328/62

[56] References Cited

U.S. PATENT DOCUMENTS

| | | | |
|---|---|---|---|
| 4,191,998 | 3/1980 | Carmody | 364/200 |
| 4,203,153 | 5/1980 | Boyd | 364/200 |
| 4,218,876 | 8/1980 | Hashimoto et al. | 368/10 |
| 4,317,180 | 2/1982 | Lies | 364/707 |
| 4,317,181 | 2/1982 | Teza et al. | 364/707 |
| 4,409,665 | 10/1983 | Tubbs | 364/707 |
| 4,435,757 | 3/1984 | Pross | 364/200 |
| 4,463,440 | 7/1984 | Nishiura | 364/900 |
| 4,509,120 | 4/1985 | Daudelin | 364/200 |
| 4,615,005 | 9/1986 | Maejima et al. | 364/200 |

FOREIGN PATENT DOCUMENTS 60-19223 1/1985 Japan .

OTHER PUBLICATIONS

"Designing with the 80C88—A Fully Static CMOS Processor", 8181 New Electronics, 17, (1984), Jul., No. 14, Warley, West Midlands, Great Britain.
"80C88 CMOS 8/16 Bit Microprocessor".
Japanese Patent Abstract No. 60-19223 entitled "Data Processor".
"CMOS Micros Enter the Mainstream" in Computer Design, vol. 23, No. 6, Jun., 1984.
"Eight-Bit CMOS Microcomputer Unit Ideal for Intellient Telephone Systems", printed in the A Mini-Micro Conference Record, May, 1984.

Primary Examiner—Lawrence E. Anderson
Attorney, Agent, or Firm—Thomas E. Tyson

[57] ABSTRACT

A clocking circuit connected to a processor for regulating processor operation and including a control circuit that produces a clock signal at a first frequency or for producing a clock signal at a designated one of a plurality of other selectable frequencies in response to a change signal from the processor. The control circuit is connected to a designating circuit that provides a signal to the control circuit to designate one of the selectable frequencies. In the preferred embodiment, the clocking circuit includes a register addressable by the processor and a frequency generator that generates several signals having unique frequencies. The processor may designate one of the frequencies as the clocking frequency by providing the appropriate data to the register. Upon the occurrence of an external event such as a DMA request or an interrupt, the control circuit will provide the clocking signal at a predetermined frequency.

16 Claims, 3 Drawing Sheets

MULTI-FREQUENCY CLOCK GENERATION WITH LOW STATE COINCIDENCE UPON LATCHING

This is a continuation of application Ser. No. 06/820,454 filed Jan. 17, 1986, now abandoned.

TECHNICAL FIELD

This invention relates to clock signal generation for computing circuits and more specifically relates to the generation of multiple frequency clocking signals.

BACKGROUND ART

Computer and processing circuits use a clocking signal to synchronize the operation of internal circuits. The clocking signals are always present whether or not the processing circuits are actually processing data or awaiting further inputs. During these waiting periods, the normal operation of the processing circuit results in a waste of power. This is especially disadvantageous to a processing circuit having a fixed power source such as a battery.

Battery powered processing circuits are common in portable calculators. One technique for conserving battery power is contained in U.S. Pat. No. 4,317,181 entitled "Four Mode Microcomputer Power Save Operation" that discloses the means to turn off clocked logic while power is maintained to certain specific circuits connected to the memory. In a related patent, U.S. Pat. No. 4,409,665, a processor circuit is disclosed that includes logic forced to a predefined output logic level during inactivity. Power consumption is less when the logic is at this predetermined output logic level.

A similar type technique is disclosed in U.S. Pat. No. 4,317,180.

U.S. Pat. No. 4,218,876 entitled "Combined Timekeeper and Calculator with Low Power Consumption Features" discloses a dual mode calculator wherein the clocking signals are modified to create additional signals when the calculator is in one specific mode.

A further technique is disclosed in U.S. Pat. No. , 4,203,153 entitled "Circuit for Reducing Power Consumption in Battery Operated Microprocessor Base Systems" that includes a circuit for disconnecting the microprocessor from a battery source for a predetermined time interval.

DISCLOSURE OF THE INVENTION

In accordance with the present invention, a clocking circuit is disclosed that includes a circuit for producing a clock signal at a first frequency and further for changing the frequency of the clock signal to one of several other selected frequencies in response to a change signal. This circuit is further connected to a second circuit that designates the selected frequency.

In the preferred embodiment, the invention includes a clocking circuit that is connected to a processor. The output of the clocking circuit is a clocking signal which is used by the processor to control processor operation. The clocking circuit includes a clocking control circuit connected to a clocking signal register and a frequency generator. The frequency generator includes an oscillator and divide-by circuits that provide several signals, each having a unique frequency. The clock circuit register is connected to the processor to receive data and interrupts from the processor. The clock control circuit is connected to both the clock register and the frequency generator and changes the frequency of the clock signal in accordance with inputs from the clock register. However, these changes are only made during predetermined time intervals.

The actual frequency of the clock signal output by the clock control circuit is determined by the data contents of the clock register. The clock register receives inputs from a data bus from the processor. In addition, one bit position of this register is set in response to an occurrence of an interrupt or a direct memory access request from the processor.

In operation, the processor through the data bus may direct the clock control circuit to output a slow clock frequency. This is accomplished by the processor loading specific data into the clock register. The clock register is input to the clock control circuit which selects the appropriate signal frequency from the frequency generator. The operation of the processor at the slower clock rate results in lower power consumption. When either an interrupt or a direct memory access request is received, the contents of one bit position of the clock register is automatically set to a zero which, when input to the clock control circuit, results in the clock control circuit providing a clock signal at the normal operating frequency. Implementation of this clocking circuit allows programmability of the processor operating speed while also automatically providing a normal processor operating speed upon the occurrence of some event such as an interrupt or a direct memory access request.

BRIEF DESCRIPTION OF THE DRAWING

The novel features believed characteristic of the invention are set forth in the appended claims. The invention itself, however, as well as other features and advantages thereof, will be best understood by reference to the following description of the preferred embodiment, when read in conjunction with the accompanying figures, wherein:

BEST MODE FOR CARRYING OUT THE INVENTION

Power conservation in the operation of a data processor becomes important when the processor is connected to a battery or some other fixed power supply. The power drain of a processor fabricated with CMOS technology is directly related to the number of logic state transitions that occur. The higher the number of logic state transitions, the larger the amount of power that is consumed. One way to reduce the number of logic state transitions is to slow the processor system clock frequency during appropriate times such as when the processor is in an idle state, i.e., waiting for a keyboard input. In some implementations, the processor system clock can be entirely shutoff until a system interrupt (INT), an non-maskable (NMI), or a direct memory access (DMA) request occurs. When such an event does occur, the processor system clock should be operating at its normal frequency in order that the processor may perform at the normal operating speed.

When the clock signal frequencies are changed, the changes must occur in a manner to insure that an invalid clock high-time or an invalid clock low-time does not occur. In other words, the change of frequency must occur such that the resulting clock signal still provides the minimum clock high-time or minimum clock low-time as specified for the processor. In the preferred embodiment, the processor is a Harris or Intel 80C88 CMOS microprocessor. The specification for this microprocessor is herein incorporated by reference. According to this specification, the minimum clock low-time is 118 nanoseconds and the minimum clock high-time is 69 nanoseconds.

The present invention provides circuitry that enables the processor to specify a slower than normal clock frequency while insuring that the clock frequency will be restored to the normal operating frequency during the occurrence of events such as interrupts or DMA requests. Furthermore, the present invention provides that the transition of clock frequencies will occur such that the transitions will conform to the minimum clock high and minimum clock low values specified.

Figure 1:
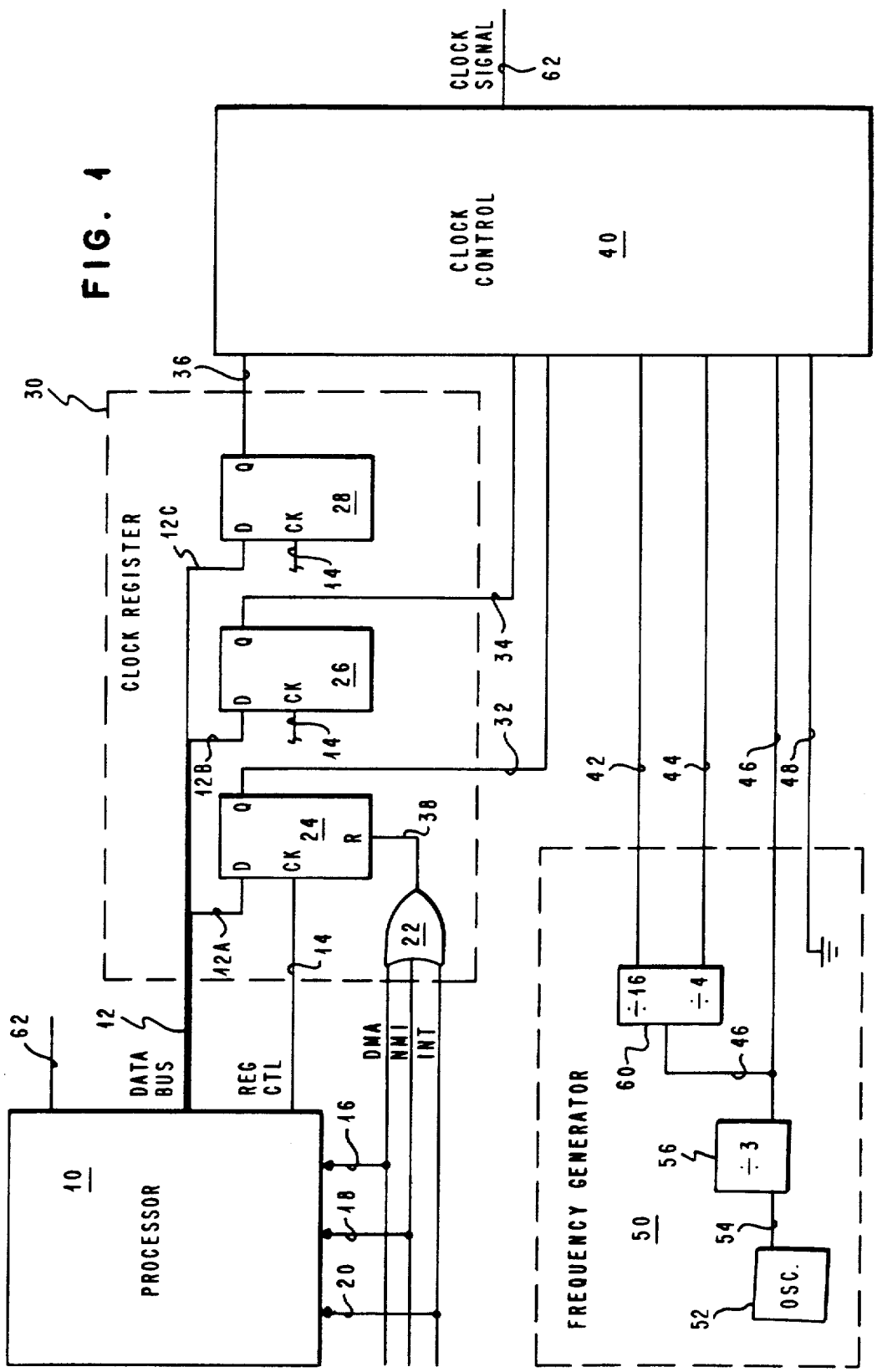
FIG. 1 is a block diagram of the clocking circuit connected to a processor.

FIG. 1 illustrates a block diagram of the present invention connected to a processor 10, the 80C88 in the preferred embodiment. The clock circuit invention includes a clock register 30, frequency generator 50 and a clock control circuit 40. The clock control circuit 40 provides a clock signal output on line 62 which is input to processor 10. This clock signal is the system clock for the processor 10. The processor 10 controls the speed of the clock signal on line 62 by its interconnection to the clock register 30.

The clock register 30 includes a data bus 12, a register control line 14, and processor event lines 16, 18 and 20. The data bus 12 is connected to three D type flip-flops 24, 26, and 28. The register control line 14 is also connected to the clocking input to flip-flops 24, 26 and 28. The external events on lines 16, 18 and 20 includes a DMA request (DMA), a non-maskable interrupt (NMI), and an interrupt (INT) respectively. Lines 16, 18 and 20 are input to an OR gate 22 whose output on line 38 is connected to the set input on flip-flop 24. The outputs of flip-flops 24, 26 and 28, on lines 32, 34, and 36 respectively, are provided to the clock control circuit 40 as shown. In operation, processor 10 provides the input values to the three flip-flops 24, 26 and 28 over data bus 12. The register control line 14 includes a clocking control signal such as an I/O write signal that enables the D inputs to the flip-flops 24, 26 and 28 to be loaded by data bus 12. The OR gate 22 sets the output of flip-flop 24 to a 1 upon the occurence of any of the external events, i.e., a DMA request, a NMI or an INT occurence.

The frequency generator 50 consists of an oscillator 52 providing an output on line 54 to a divide-by three circuit 56. The divide-by three circuit 56 provides a frequency signal on line 46 to both the clock control circuit 40 and to another divide-by circuit 60. The divide-by circuit 60 provides two signals one lines 42 and 44 respectively. In the preferred embodiment, oscillator 52 produces a signal having a frequency of 14.318 megahertz. This signal is provided on line 54 to the divide-by three circuit 56 which produces a 4.773 megahertz signal on line 46 that further has a 33% duty cycle. The divide-by circuit 60 includes a divide-by 16 and a divide-by 4 output that produced a 0.298 megahertz signal on line 42 and a 1.193 megahertz signal on line 44, respectively. The frequency generator 50 further includes a line 48 that is tied to ground for producing a 0 hertz signal.

In operation, the clock register 30 data on lines 32, 34, and 36 designate to the clock control circuit 40 to provide one of the frequency signals on lines 42, 44, 46 or 48 as the clock signal on line 62.

In the preferred embodiment, the normal operating clock frequency is 4.773 megahertz as provided on line 46. The slower frequencies on lines 42 and 44 are integer fractions of this normal operating frequency.

In operation, the processor 10 may designate a slower clock speed by providing the appropriate input by a data bus 12 to the clock register 30. This input provided to the clock control circuit 40 will designate the slower frequency signal as the clock signal on line 62. Upon the occurrence of any one external event on lines 16, 18 or 20, the output of clock register 30 will be changed such that the clock control circuit 40 will provide the normal frequency clock signal from line 46 on line 62.

Figure 2:
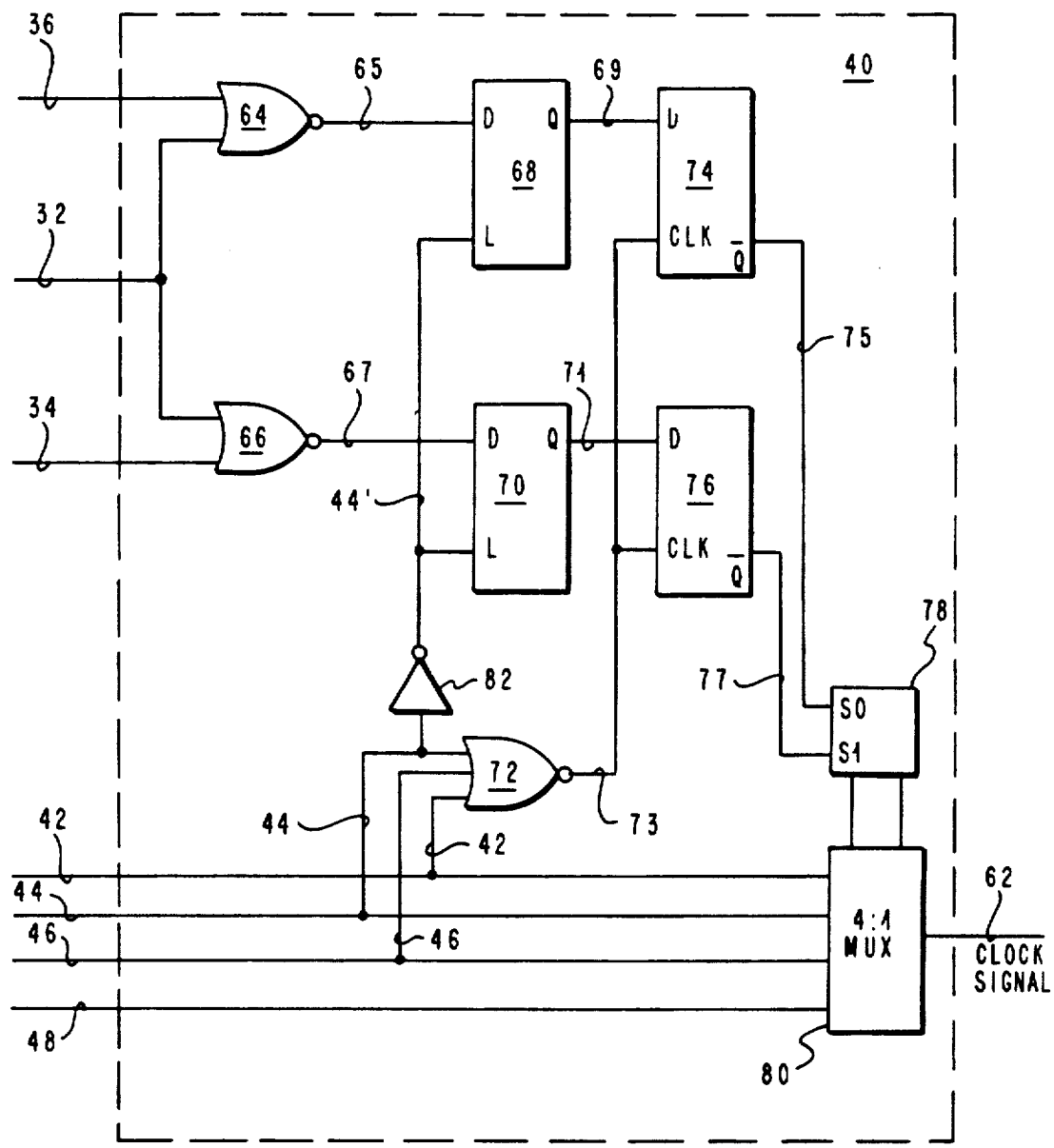
FIG. 2 is a schematic diagram of the clock control circuit.

FIG. 2 is a schematic diagram of the clock control circuit 40. Lines 32, 34 and 36 are input to two NOR gates 64 and 66 which provide outputs on lines 65 and 67 respectively to two latches 68 and 70. The input on line 32 from flip-flop 24 (see FIG. 1) is provided to both NOR gates 64 and 66 such that the occurrence of an external event, i.e., a DMA request or the occurrence of an INT or a NMI signal, will result in a "zero" input to both latches 68 and 70 by lines 65 and 67 respectively. Latches 68 and 70 provide outputs on lines 69 and 71 respectively to the flip-flops 74 and 76. The output of the flip-flops 74 and 76, on lines 75 and 77 respectively, are provided to a multiplexer switch 78. The multiplexer switch 78 is connected to a four to one multiplexer 80 which connects line 62 to one of the four input lines 42, 44, 46 or 48 to provide the clock signal at the appropriate frequency. In other words, the two binary bits output from the flip-flops 74 and 76 designate one of the input lines 42, 44, 46 or 48 as the clock signal.

To insure that the minimum clock high and minimum clock low times are provided by the clock signal output on line 62, additional circuitry is included in the clock control circuit 40. This circuitry includes NOR gate 72 and inverter 82 connected as shown. Specifically, line 44 is input to inverter 82 which provides an inverted signal on line 44' to latches 68 and 70. The signal on line 44' latches the inputs on lines 65 and 67 to latches 68 and 70 respectively for the negative period of the 1.193 megahertz signal on line 44. This signal on line 44' insures that the output of latches 68 and 70 is held constant on lines 69 and 71 for the appropriate time interval.

NOR gate 72 is connected to lines 42, 44, and 46 to provide an output on line 73 which is the clocking signal input to the flip-flops 74 and 76. This circuit arrangement insures that all frequency input signals are in the same transition state before the multiplexer 80 is allowed to change from one frequency signal to another.

Figure 3:
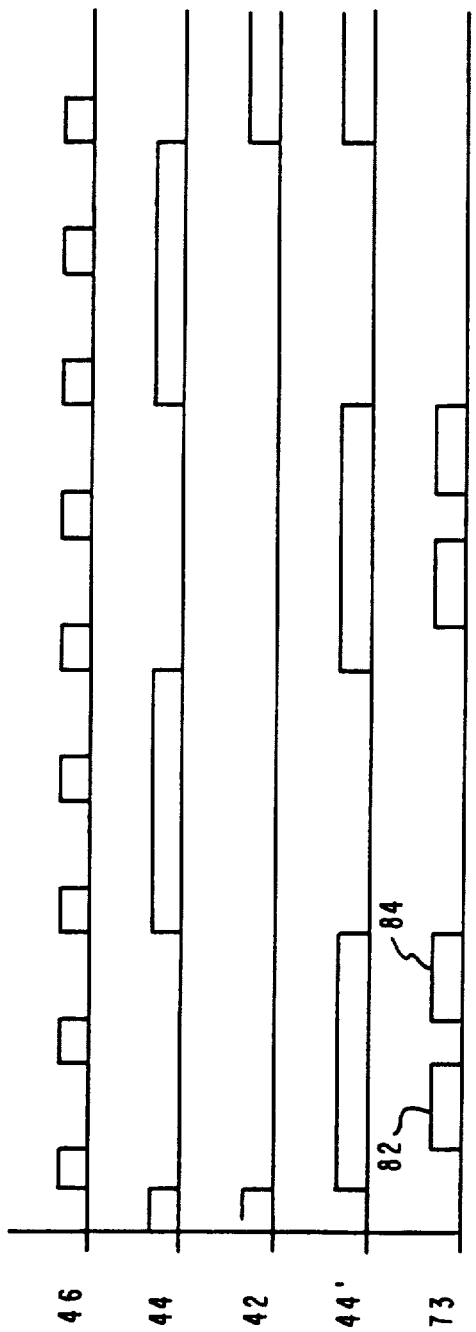
FIG. 3 is a timing diagram illustrating internal signals in the clocking control circuit.

FIG. 3 is a timing diagram illustrating the 4.773 megahertz signal on line 46, the 1.193 megahertz signal on line 44, the 0.298 megahertz signal on line 42, the inverted 1.193 megahertz on line 44', and the signal on line 73. As previously discussed, the signal on line 44' insures that the contents of latches 68 and 70 is held constant for the time period illustrated in FIG. 3. During this time period, two positive pulses 82 and 84 are provided on line 73 which allow the inputs on lines 69 and 71 to be clocked in as inputs to the flip-flops 74 and 76 and thus allowing the output on lines 75 and 77 respectively to transition. Therefore, the signal on line 44' allows the outputs of latches 68 and 70 to be held constant and stabilize before they are clocked as inputs into latches 74 and 76. In addition, the clocking signal on line 73 insures that the outputs of the flip-flops 74 and 76, the multiplexer selector inputs, only transition when all of the signals on lines 42, 44, 46 and 48 are low. This insures that multiplexer switching glitches do not propagate through to the clock signal line 62. Thus, the signals on lines 44′ and 73 insure that glitches do not occur on clock signal line 62 that would result from transitions and inputs on lines 32, 34, and 36 or upon transitions of signals on lines 42, 44, 46 or 48.

Although the invention has been described with reference to this specific embodiment, this description is not meant to be construed in a limiting sense. Various modifications of the disclosed embodiment, as well as other embodiments of the invention, will become apparent to persons skilled in the art upon reference to the description of this invention. It is, therefore, contemplated that the appended claims will cover any such modifications or embodiments as fall within the true scope of the invention.

We claim:

1. A clock circuit connected to a processor to provide a clock signal to said processor and to change frequency of the clock signal in response to said processor, said clock circuit comprising:
   frequency means for producing a plurality of constant frequency signals, each having a unique constant frequency;
   latching means for holding data from said processor designating one of said plurality of constant frequency signals for a predetermined period longer than a complete cycle of the highest frequency of said plurality of constant frequency signals;
   generation means for generating a clock signal from said designated frequency signal; and
   sending means for providing said clock signal from said designated frequency signal to said processor upon a first low state coincidence of all of said plurality of constant frequency signals after said data is held by said latching means.

2. A clock circuit according to claim 1 wherein said clock signal is said designated frequency signal.

3. A clock circuit according to claim 2 wherein said plurality of constant frequency signals include at least three frequency signals and said predetermined period is a complete cycle of an intermediate frequency signal of said plurality of constant frequency signals.

4. A clock circuit connected to a processor to provide a clock signal to said processor and to change frequency of the clock signal in response to said processor, said clock circuit comprising:
   frequency means for producing a plurality of constant frequency signals from an oscillator, each of said signals having a unique constant frequency being either an integer division of a frequency of said oscillator or a zero frequency;
   latching means for holding data from said processor designating one of said plurality of constant frequency signals for a predetermined period longer than a complete cycle of the highest frequency of said plurality of constant frequency signals;
   generation means for generating a clock signal from said designated frequency signal; and
   sending means for providing said clock signal from said designated frequency signal to said processor upon a first low state coincidence of all of said plurality of constant frequency signals after said data is held by said latching means.

5. A clock circuit according to claim 4 wherein said clock signal is said designated frequency signal.

6. A clock circuit according to claim 5 wherein said generation means includes a register means connected to said latching means for receiving and storing said data from said latching means designating said frequency signal.

7. A clock circuit according to claim 6 wherein said sending means includes logic means connected to all of said frequency signals in said frequency means for providing an enabling signal to said register means for providing said clock signal to said processor when all of said frequency signals are in the same low state.

8. A clock circuit according to claim 7 wherein said clock circuit further includes receiver means connected between said processor and said latching means for receiving and storing said data from said processor and for sending said data to said latching means.

9. A clock circuit according to claim 8 wherein said receiver means further receives an external event signal on an occurrence of an external event and, in response thereto, said receiver means designates a predetermined one of said plurality of frequency signals.

10. A clock circuit connected to a processor to provide a clock signal to said processor and to change frequency of the clock signal in response to said processor, said clock circuit comprising:
    an oscillator means for producing a signal at a first constant frequency;
    frequency means connected to said oscillator means for producing a plurality of constant frequency signals, each having a unique constant frequency being either an integer division of said first constant frequency or a zero frequency;
    receiver means for receiving and storing data from said processor designating one of said plurality of frequency signals;
    latching means connected to said receiver means for holding said data received from said receiver means for a predetermined period longer than a complete cycle of the highest frequency of said plurality of constant frequency signals so as to insure that a transition of clock frequency satisfies minimum clock high and minimum clock low values of said processor;
    generation means connected to said frequency means and said latching means for generating a clock signal from said designated frequency signal; and
    sending means connected to said frequency means and said generation means for providing said clock signal to said processor upon a first low state coincidence of all of said plurality of constant frequency signals after said data is held by said latching means.

11. A clock circuit according to claim 10 wherein said frequency means includes a plurality of frequency divider circuits interconnected to said oscillator means for providing said plurality of frequency signals.

12. A clock circuit according to claim 11 wherein said generation means includes a register means for receiving and storing said data from said latching means designating said frequency signal.

13. A clock circuit according to claim 12 wherein said clock signal is said designated frequency signal.

14. A clock circuit according to claim 13 wherein said sending means includes logic means connected to all of said frequency signals in said frequency means for providing an enabling signal to said register means when all of said frequency signals are in the same low state for providing said clock signal to said processor.

15. A clock circuit according to claim 14 wherein said receiver means further receives an external event signal and in response thereto designates a predetermined one of said plurality of frequency signals upon the reception of the external event signal.

16. A clock circuit connected to a processor to provide a clock signal to said processor and to change frequency of the clock signal in response to said processor or an occurrence of an external event, said clock circuit comprising:
frequency means for producing a plurality of constant frequency signals, each having a unique constant frequency;
receiver means for receiving and storing data from said processor designating one of said plurality of constant frequency signals, or, upon an occurrence of said external event, designating a predetermined one of said plurality of constant frequency signals;
latching means for receiving said data from said receiver means and for holding said data for a predetermined period longer than a complete cycle of the highest frequency of said plurality of constant frequency signals so as to insure that a transition of clock frequency satisfies minimum clock high and minimum clock low values of said processor;
generation means for generating a clock signal from said designated frequency signal, said generation means including,
register means for receiving and storing said data designating one of said plurality of constant frequency signals from said latching means, and
multiplexer means for selecting said designated frequency signal from said plurality of constant frequency signals upon receiving said data from said register means; and
sending means for providing said clock signal from said designated frequency signal to said processor upon a first low state coincidence of all of said plurality of constant frequency signals after said data is held by said latching means, said sending means including,
logic means connected to all of said frequency signals in said frequency means for providing an enabling signal to said register means when all of said frequency signals are in the same low state.

* * * * *